(12) United States Patent
Pany et al.

(10) Patent No.: US 12,020,083 B2
(45) Date of Patent: Jun. 25, 2024

(54) WORKLOAD IDENTIFICATION AND CAPTURE

(71) Applicant: ASURVIO, LP, Temple, TX (US)

(72) Inventors: Brett Pany, Lakeway, TX (US); Bogdan Odulinski, Austin, TX (US); Daniel E. Salazar, Round Rock, TX (US)

(73) Assignee: ASURVIO, LP, Austin, TX (US)

( * ) Notice: Subject to any disclaimer, the term of this patent is extended or adjusted under 35 U.S.C. 154(b) by 413 days.

(21) Appl. No.: 17/404,738

(22) Filed: Aug. 17, 2021

(65) Prior Publication Data

US 2022/0075667 A1 Mar. 10, 2022

Related U.S. Application Data

(60) Provisional application No. 63/076,778, filed on Sep. 10, 2020.

(51) Int. Cl.
*G06F 3/00* (2006.01)
*G06F 9/50* (2006.01)
(52) U.S. Cl.
CPC .......... *G06F 9/5083* (2013.01); *G06F 9/5038* (2013.01); *G06F 9/5044* (2013.01); *G06F 9/505* (2013.01)
(58) Field of Classification Search
CPC ..................................................... G06F 9/455
See application file for complete search history.

(56) References Cited

U.S. PATENT DOCUMENTS

| 8,438,378 B2 | 5/2013 | Lazar | |
|---|---|---|---|
| 10,452,440 B1 | 10/2019 | Odulinski et al. | |
| 10,884,806 B1 | 1/2021 | Odulinski et al. | |
| 11,138,049 B1* | 10/2021 | Featonby | G06F 11/3447 |
| 2012/0137002 A1* | 5/2012 | Ferris | G06F 9/5072 |
| | | | 709/226 |
| 2017/0097743 A1* | 4/2017 | Hameed | G06F 3/0484 |

(Continued)

OTHER PUBLICATIONS

Zhuqing Xu, GScheduler: Optimizing Resource Provision by Using GPU Usage Pattern Extraction in Cloud Environments. (Year: 2017).*

*Primary Examiner* — Lechi Truong
(74) *Attorney, Agent, or Firm* — WINSTEAD PC

(57) ABSTRACT

In an embodiment, a method includes receiving user-behavior data for a plurality of software applications. The method also includes determining activity windows for the plurality of software applications. The method also includes generating a time map of the activity windows. The method also includes detecting a usage pattern, where the usage pattern indicates two or more applications of the plurality of software applications that are used in combination. The method also includes identifying a user-centric workload from the usage pattern. The method also includes generating a user-centric workload specification for the user-centric workload, where the user-centric workload identifies the two or more applications indicated by the usage pattern. The method also includes associating the user-centric workload specification with an optimization trigger and an optimization profile. The method also includes optimizing the user-centric workload in accordance with the optimization trigger and the optimization profile.

19 Claims, 7 Drawing Sheets

(56) References Cited

U.S. PATENT DOCUMENTS

2020/0301723 A1\* 9/2020 Gabrielson ............ G06N 3/044
2020/0301740 A1\* 9/2020 Gabrielson .............. G06N 3/08
2020/0301741 A1\* 9/2020 Gabrielson ........... G06F 9/5038
2022/0075667 A1\* 3/2022 Pany .................... G06F 11/323

\* cited by examiner

WORKLOAD IDENTIFICATION AND CAPTURE

CROSS-REFERENCE TO RELATED APPLICATIONS

This patent application claims the benefit under 35 U.S.C. § 119(e) of U.S. Provisional Patent Application No. 63/076,778 filed on Sep. 10, 2020. U.S. Provisional Patent Application No. 63/076,778 is hereby incorporated by reference in its entirety.

BACKGROUND

Technical Field

The present disclosure relates generally to resource management and more particularly, but not by way of limitation, to systems and methods for workload identification capture.

History of Related Art

Just as an automobile engine cannot generally be tuned to maximize both distance and speed, computing environments cannot generally be optimized for every usage scenario at the same time. For example, while some automobiles provide a 'Sport' versus 'Eco' mode to allow choice between speed and distance, as a general matter, the choice of how to optimize a computing environment must be made manually by a user.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of identifying and optimizing user workloads. The method includes receiving user-behavior data for a plurality of software applications over a period of time. The method also includes determining activity windows for the plurality of software applications. The method also includes generating a time map of the activity windows over the period of time. The method also includes detecting a usage pattern that occurs in the period of time, where the usage pattern indicates two or more applications of the plurality of software applications that are used in combination. The method also includes identifying a user-centric workload from the usage pattern. The method also includes generating a user-centric workload specification for the user-centric workload, where the user-centric workload identifies the two or more applications indicated by the usage pattern. The method also includes associating the user-centric workload specification with an optimization trigger and an optimization profile. The method also includes optimizing the user-centric workload in accordance with the optimization trigger and the optimization profile. Other embodiments of this aspect include corresponding computer systems, apparatus, and computer programs recorded on one or more computer storage devices, each configured to perform the actions of the methods.

In an embodiment, another general aspect includes a computer system that includes a processor and memory. The processor and the memory in combination are operable to implement a method. The method includes receiving user-behavior data for a plurality of software applications over a period of time. The method also includes determining activity windows for the plurality of software applications. The method also includes generating a time map of the activity windows over the period of time. The method also includes detecting a usage pattern that occurs in the period of time, where the usage pattern indicates two or more applications of the plurality of software applications that are used in combination. The method also includes identifying a user-centric workload from the usage pattern. The method also includes generating a user-centric workload specification for the user-centric workload, where the user-centric workload identifies the two or more applications indicated by the usage pattern. The method also includes associating the user-centric workload specification with an optimization trigger and an optimization profile. The method also includes optimizing the user-centric workload in accordance with the optimization trigger and the optimization profile.

In an embodiment, another general aspect includes a computer-program product that includes a non-transitory computer-usable medium having computer-readable program code embodied therein. The computer-readable program code is adapted to be executed to implement a method. The method includes receiving user-behavior data for a plurality of software applications over a period of time. The method also includes determining activity windows for the plurality of software applications. The method also includes generating a time map of the activity windows over the period of time. The method also includes detecting a usage pattern that occurs in the period of time, where the usage pattern indicates two or more applications of the plurality of software applications that are used in combination. The method also includes identifying a user-centric workload from the usage pattern. The method also includes generating a user-centric workload specification for the user-centric workload, where the user-centric workload identifies the two or more applications indicated by the usage pattern. The method also includes associating the user-centric workload specification with an optimization trigger and an optimization profile. The method also includes optimizing the user-centric workload in accordance with the optimization trigger and the optimization profile.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

For purposes of this patent application, a computing environment can refer to the environment in which physical and/or virtual computing resources are consumed, often at the direction of a user, computer process or other entity. A computing environment can include, among other things, physical and virtual computing resources, an operating system, and software applications. One way to optimize a computing environment might be to assume that a specific goal is to be achieved under specific environmental circumstances. In commercial enterprise infrastructure, for example, a server might be dedicated and tuned for specific tasks to maximize its efficiency for a given workload. When the workload changes, however, the manner in which the server was tuned can lose its effectiveness. Similarly, users who use their devices for different purposes generally discover that performance changes based on which applications they are using.

The present disclosure describes examples of a system that intelligently defines, and optimizes a computing environment for, user-centric workloads. In a typical embodiment, user-centric workloads can be a software application or a combination of software applications that, at any given time, are expected objects of user behaviors, where such workloads can be defined in user-centric workload specifications. User behaviors can include any user interaction with a software application such as, for example, a user launching, closing, or giving focus to the software application.

In certain embodiments, the user-centric workload specifications can be progressively established by monitoring user behaviors and detecting usage patterns based thereon. For example, a user, or even many users, may repeatedly launch both a video-editing application and a graphic-design application so as to execute a production task of incorporating or overlaying graphics into video. During each execution of the task, the user may switch between the two applications several times, which actions result in recorded user behaviors for both applications. According to this example, the coincidence of recorded user behaviors for both software applications can result in a usage pattern being detected, a new user-centric workload being identified and a corresponding new user-centric workload specification being created, where the new user-centric workload specification identifies or specifies the video-editing application and the graphic-design application. Thereafter, the new user-centric workload specification can be associated with triggers indicative of a corresponding user-centric workload and timely optimizations that are appropriate for improving performance and/or an end-user experience for the two software applications. In other examples, user behaviors can be classified for marketing purposes, including prediction of behaviors such as purchase or cancellation of service. Further examples will be described below relative to the Drawings.

Figure 1:
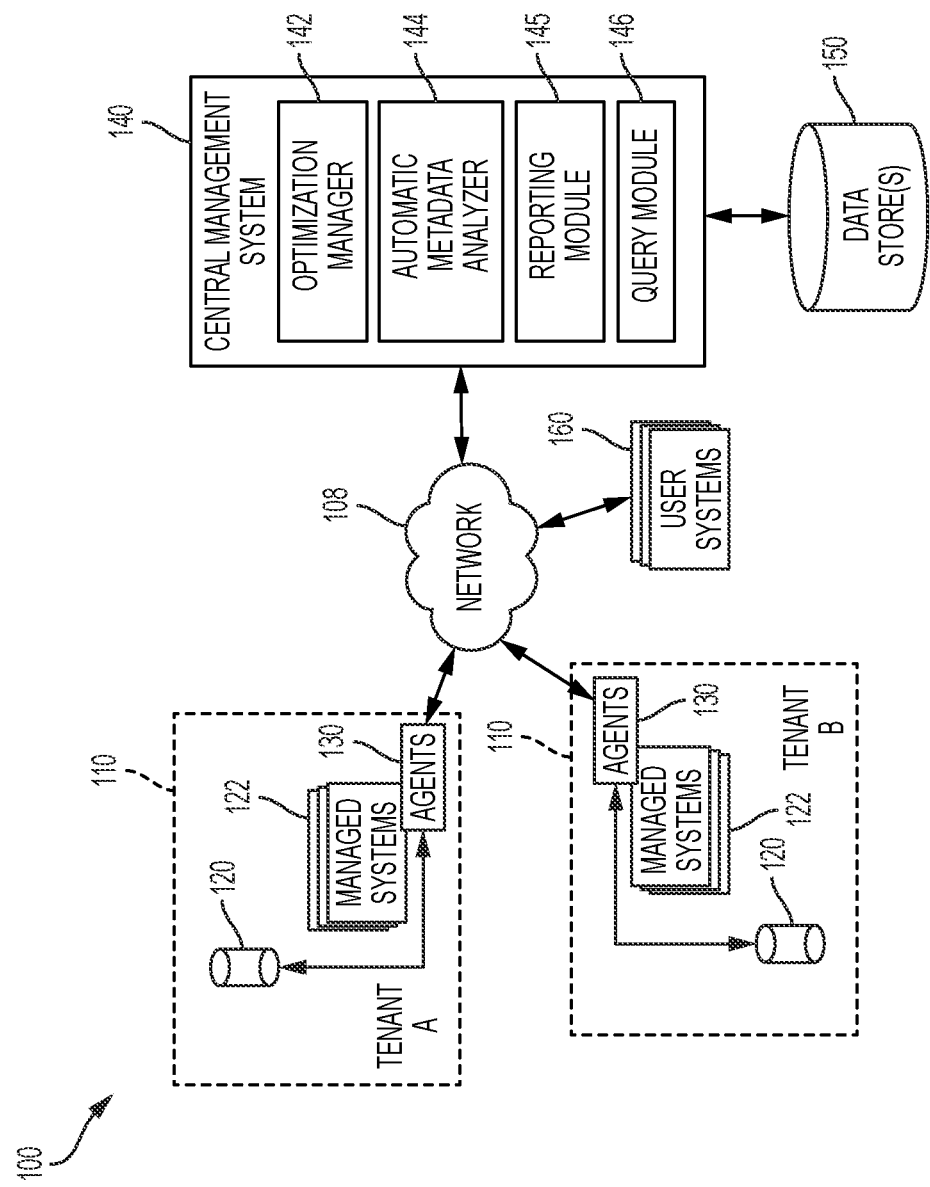
FIG. 1 illustrates an example of a system for implementing a central management system.

FIG. 1 illustrates an example of a system 100 for implementing a central management system 140. The system 100 includes the central management system 140, tenant systems 110, user systems 160 and one or more data stores 150, each of which is operable to communicate over a network 108. The network 108 may be a private network, a public network, a local or wide area network, a portion of the Internet, combinations of the same, and/or the like. Each of the tenant systems 110 can represent an installation of physical and/or virtual computing infrastructure.

In certain embodiments, the central management system 140 can centrally manage agent-initiated optimizations of computing environments, such as individual user environments and workspaces, for its tenants. In particular, in the system 100, the tenant systems 110 can be served by the central management system 140. The tenant systems 110 shown can be owned or operated by the same or different entities. For example, one of the tenant systems 110 is shown as owned or operated by "Tenant A" while another tenant system 110 is owned or operated by a different tenant, "Tenant B." For example, Tenants A and B can represent customers (e.g., entities such as companies or individuals) of an operator of the central management system 140. Although the term "tenant" is used herein to describe the systems 110 or owners/operators thereof, in addition to having its ordinary meaning, the term "tenant" can, but need not, refer to tenancy in a multitenant software architecture.

Each of the tenant systems 110 includes one or more managed systems 122 and one or more local data stores 120 (hereinafter, "local data store(s) 120"). The managed systems 122 can include physical and/or virtual computing devices, such as physical machines and/or virtual machines. For instance, the managed systems 122 may include any of the following: a physical computer system, a virtual machine, server, web server, application server, database, database server, network switches or other network hardware, combinations of the same or the like. Any given tenant system 110 can include from one to several managed systems 122. For example, a tenant system 110 can represent an entire data center having hundreds or even thousands of managed systems 122. An example of a computer system that can serve as one of the managed systems 122 will be described in relation to FIG. 2.

As illustrated, the managed systems 122 can include optimization agents 130 that are installed in computing environments provided thereby. The optimization agents 130 can facilitate monitoring and automatic optimization of the computing environments in accordance with optimization settings stored in the local data store(s) 120. Specifically, the optimization settings of the local data store(s) 120 can include, for example, user-centric workload specifications, optimization triggers, optimization profiles, other information or settings, combinations of same and/or the like.

In general, the user-centric workload specifications of the local data store(s) 120 can each specify a user-centric workload as a software application, or combination of software applications, that, at any given time, are expected objects of user behaviors. Each user-centric workload specification can be associated with an optimization trigger in the local data store(s) 120 that is indicative of the specified user-centric workload. In addition, or alternatively, each user-centric workload specification (and/or the associated optimization trigger) can be associated with an optimization profile in the local data store(s) 120 that represents optimizations that are performed for the specified user-centric workload.

In general, the optimization triggers of the local data store(s) 120 can each specify an event, the occurrence of which results in a given optimization agent of the optimization agents 130 optimizing a computing environment in accordance with an associated optimization profile. The event can be, for example, a user behavior (or combination of user behaviors) with respect to one or more software applications (e.g., launch, close, or giving or taking away focus), a scheduled point in time (or window of time), etc. Each optimization profile of the local data store(s) 120 can specify, for example, one or more services to be stopped, one or more processes to be ended, one or more environment settings to be modified, combinations of the same and/or the like. As previously mentioned, some or all of the optimization triggers and the optimization profiles of the local data store(s) 120 can be associated with one or more of the user-centric workload specifications of the local data store(s) 120.

Although user-centric workload specifications, optimization triggers, and optimization profiles are described separately herein for clarity of description, it should be appreciated that two or more of them may be combined. For example, a given user-centric workload specification can include an associated optimization trigger and/or an associated optimization profile. In addition, or alternatively, the optimization trigger can, in effect, be the software application(s) identified in a given user-centric workload specification, such that a user launch of such software application(s) (or any one of the software application(s) in some embodiments) is an optimization trigger.

In certain implementations, the optimization agents 130 can monitor for the optimization triggers specified in the local data store(s) 120, which triggers may be associated with or relate to particular user-centric workload specifications as described previously. As optimization triggers are detected, the optimization agents 130 can perform particular optimizations that are specified in optimization profiles associated with the triggers. For example, the optimization agents can stop one or more services, end one or more processes, change one or more environment settings, combinations of same and/or the like. Example operation of the optimization agents 130 with respect to example optimization settings will be described in greater detail with respect to FIGS. 2-5.

In certain embodiments, the optimization settings of the local data store(s) 120 can be established at a central level by the central management system 140, at a tenant level by one or more of the tenant systems 110, and/or at an individual system or user level for individual ones of the managed systems 122. In some cases, some or all of the local data store(s) 120 can be tenant-specific such that the managed systems 122 of at least some of the tenant systems 110 can share, for example, repositories of optimization settings, some which may be customized by or for particular tenants. In some cases, some or all of the local data store(s) 120 can be system-specific such that at least some of the managed systems 122 maintain their own repositories of optimization settings, some of which may be customized for particular systems or users. In addition, or alternatively, in some embodiments, the local data store(s) 120 can be omitted such that all optimization settings are accessed directly from the central management system 140 without a local copy being retained by individual tenants or systems.

In certain embodiments, the optimization agents 130 can generate operational data, such as user-behavior data and optimization metadata, during the course of operation. In particular, the optimization agents 130 can generate or record user-behavior data that is representative of detected user behaviors with regard to software applications. For example, in various embodiments, for each detected user behavior, the recorded user-behavior data can indicate an application (e.g., by application identifier), a type of user behavior (e.g., launch, close, gaining focus or losing focus), a timestamp and/or other information.

The optimization metadata can include, for example, time-series data related to the performance of physical and/or software components, such as processor utilization, memory utilization, other resource-usage indicators, combinations of same and/or the like. The optimization metadata can also include listings of specific processes that are executing at a given point in time, system configuration data, or other data. In many cases, the optimization agents 130 can generate optimization metadata on a scheduled basis or upon the occurrence of certain events. For example, in some embodiments, the optimization agents 130 can generate optimization metadata both before and after performing optimizations specified by a given optimization profile. In that way, the identification of performance improvements, or lack thereof, can be facilitated. Optimization metadata generated by the optimization agents 130 can be stored in the local data store(s) 120 or in other memory designated for such storage.

In the illustrated embodiment, the central management system 140 can include an optimization manager 142, an automatic metadata analyzer 144, a reporting module 145 and a query module 146. Each of these components can be implemented with hardware and/or software. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

The optimization manager 142 can cause optimization agents, such as the optimization agents 130, to be installed on the managed systems 122. In some cases, the optimization agents 130 can be retrieved from the one or more data stores 150. In addition, or alternatively, the optimization manager 142 can periodically provide, from the one or more data stores 150, optimization settings to the optimization agents 130. The provided optimization settings can include, for example, user-centric workload specifications, optimization triggers, optimization profiles, updates to the foregoing, combinations of same and/or the like.

In addition, in some embodiments, the optimization manager 142 can serve a data collection function. For example, the optimization manager 142 can receive, from the optimization agents 130, tenant and/or user-specific optimization settings that are defined by a tenant or user. In addition, the optimization agents 130 can collect user-behavior data and/or optimization metadata from the managed systems 122. This user-behavior data and optimization metadata can include any of the user-behavior data or optimization metadata, respectively, described above. More particularly, the optimization metadata that is collected can also include information about attributes, characteristics, or properties of the managed systems 122. In some cases, the optimization metadata can relate to specific optimization profiles and provide performance data for times immediately before and after a particular optimization profile was applied. Also, in some cases, the optimization metadata can characterize a performance benefit of a particular application of the optimization profile, for example, in terms of processor-utilization improvement, increased memory availability, or resources freed. The optimization agents 130 can collect some or all of the above-mentioned data or metadata in real-time, periodically, e.g., according to a schedule, on-demand, or a combination of the same. In addition, the optimization agents 130 can provide some or all of the above-mentioned data or metadata to the optimization manager 142 upon request, or, in some cases, as a live stream. The optimization manager 142 can store collected data, for example, in the one or more data stores 150.

In certain embodiments, the optimization manager 142 and/or the optimization agents 130 can periodically execute a process to specify and optimize user-centric workloads. In various cases, new user-centric workloads can be specified based on an automatic analysis of user-behavior data for a particular managed system of the managed systems 122, all of the managed systems 122, or a configurable subset of the managed systems 122. Such user-centric workload specifications can be associated with optimization triggers and optimization profiles so as to enable optimization of an underlying user-centric workload. An example of specifying and optimizing user-centric workloads using recorded user behaviors will be described relative to FIG. 5.

In certain embodiments, features of the components of the central management system 140 can be made accessible over an interface to the user systems 160. For example, the optimization manager 142, or another component, can publish a configuration interface to the user systems 160, for example, for administrators, super users or other users (e.g., of a particular tenant) to select or specify commands (e.g., for adding or editing optimization settings for specific tenants or managed systems). The user systems 160 can include any type of computing device, including computer systems such as desktops, laptops, tablets, smartphones, and wearable or body-borne computers, to name a few. The user systems 160 can be operated by users associated with the tenants or by other users.

The automatic metadata analyzer 144 can automatically identify trends in optimization metadata stored in the one or more data stores 150. For example, the automatic metadata analyzer 144 can analyze each optimization profile and the optimization metadata related to its execution. In that way, the automatic metadata analyzer 144 can identify optimization profiles that, from a statistical standpoint, achieve greatest performance improvements and isolate those optimization profiles for possible expanded use. As explained previously, the one or more data stores 150 can include optimization profiles (and corresponding optimization metadata) that represent tenant and/or system-specific customizations. Advantageously, in certain embodiments, the automatic metadata analyzer 144 can leverage such customizations to realize new performance benefits from previously unknown optimization profiles.

In addition, in some embodiments, the automatic metadata analyzer 144 can identify outlier conditions in the optimization metadata for each optimization profile represented in the one or more data stores 150. For example, if a characteristic performance improvement as represented by a given metric or composite of metrics (e.g., processor utilization, memory availability, etc.) is consistently not achieved on a specific managed system, the failure to achieve that improvement (or be within a threshold range of that improvement) may be indicative of malicious software resident on that managed system. In some implementations, the automatic metadata analyzer 144 can further analyze specific processes that are executing on that managed system and isolate one or more processes that are not characteristically present in other implementations. The automatic metadata analyzer 144 can issue notifications, for example, to a user associated with the given managed system or to an administrator.

The reporting module 145 can generate regular or on-demand reports related to the managed systems 122. In various cases, these reports can provide a snapshot of some or all of the managed systems 122. The reporting module 145 typically accesses data related to the managed systems 122 via the query module 146. The reporting module 145 can publish reports or other generated information, for example, to a web page, dashboard, and/or the like. The query module 146 can generate and execute a query of the one or more data stores 150. In various cases, the query module 146 can be triggered by and work in conjunction with the reporting module 145. The web page, user dashboard or other user interface(s) output, for example, by the reporting module 145, can be accessed by users of the user systems 160. The query module 146 can also provide a user interface, for instance, that allows the users of the user systems 160 to obtain customized data related to any data maintained by the one or more data stores 150.

In general, the one or more data stores 150 can include any information collected, stored or used by the central management system 140. For example, in various embodiments, the one or more data stores 150 can include user-centric workload specifications, optimization metadata and optimization settings of the type described above. In certain embodiments, some of the optimization settings of the one or more data stores 150 can be centrally established, for example, by an administrator, super user or other user with appropriate access to the central management system 140. In addition, or alternatively, the one or more data stores 150 can include optimization settings collected from the local data store(s) 120. In these scenarios, at least some optimization settings can result from tenant-specific customizations and/or user-specific customizations on the optimization agents 130. A subset of the optimization settings on the one or more data stores 150 can be designated as public, or default, for particular use cases or classifications of tenants or users. In certain embodiments, data stored in the one or more data stores 150 can take the form of repositories, flat files, databases, etc.

Figure 2:
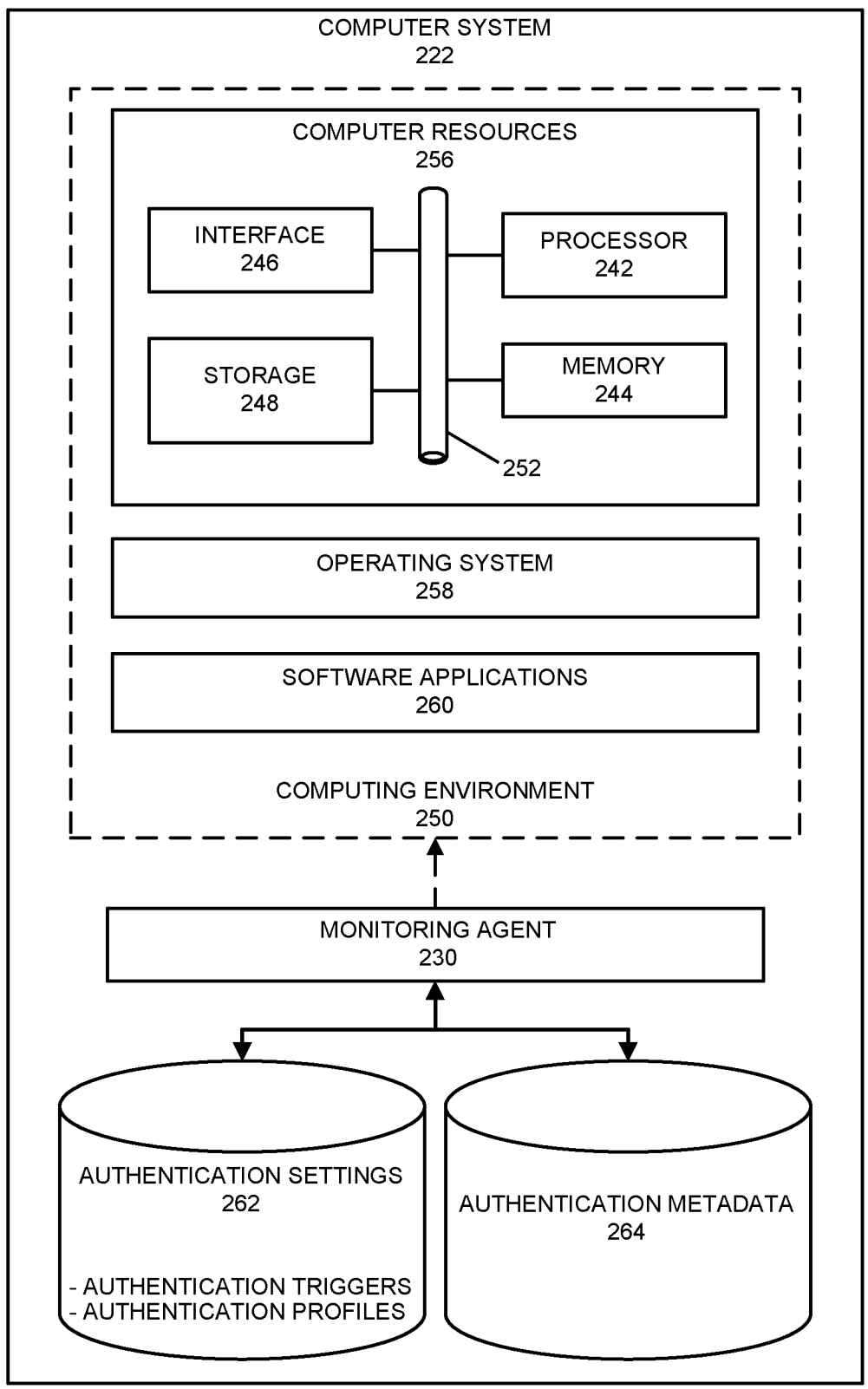
FIG. 2 illustrates an example of a computer system.

FIG. 2 illustrates an example of a computer system 222 that, in some cases, can serve as one of the managed systems 122 of FIG. 1. The computer system 222 includes an optimization agent 230 operable to monitor a computing environment 250. The computing environment 250 includes computer resources 256, an operating system 258, and software applications 260. In particular embodiments, the computer system 222 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The computer resources 256 of the computer system 222 may comprise any suitable physical form, configuration, number, type and/or layout. As an example, and not by way of limitation, the computer system 222 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 222 may include one or more computer systems; be unitary or distributed; span multiple locations; span multiple machines; or reside in a cloud, which may include one or more cloud components in one or more networks.

In the depicted embodiment, the computer resources 256 include a processor 242, memory 244, storage 248, interface 246, and bus 252. Although a particular computer system is depicted having a particular number of particular components in a particular arrangement, this disclosure contemplates any suitable computer system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the operating system 258, the software applications 260, and the optimization agent 230. Such functionality may include providing various features discussed herein. In particular embodiments, processor 242 may include hardware for executing instructions, such as those making up the optimization agent 230. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include RAM. This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the computer system 222, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the computer system 222 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the computer system 222, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which computer system 222 is used. As an example and not by way of limitation, computer system 222 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 222 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 222 may include any suitable interface 246 for any one or more of these networks, where appropriate.

In some embodiments, interface 246 may include one or more interfaces for one or more I/O devices. One or more of these I/O devices may enable communication between a person and the computer system 222. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the computer system 222 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The operating system 258 can execute on and manage the computer resources 256 as well as provide common services for computer programs. The operating system 258 can be any one of many operating systems such as, for example, a version of MICROSOFT WINDOWS, APPLE IOS or ANDROID, a distribution of LINUX, other variants of UNIX operating systems, another operating system, etc. For example, the software applications 260 can execute on the operating system 258 using the common services provided thereby.

Although not explicitly illustrated as such, the optimization agent 230 can execute on the operating system 258 as one of the software applications 260, and perform configurable optimization in accordance with optimization settings 262. In various embodiments, certain of the software applications 260 may be specified in user-centric workload specifications that are stored in the optimization settings 262, such that their launch, for example, may trigger optimization in accordance with the optimization settings 262. During the course of its execution, the optimization agent 230 can also generate and store operational data 264 of the type described with respect to FIG. 1. In certain embodiments, the optimization settings 262 can include user-centric workload specifications and definitions of optimization triggers and optimization profiles. The optimization settings 262 and the operational data 264 can reside in the storage 248 or in other memory such as, for example, one or more tenant-specific data stores that are shared across multiple managed systems. The optimization settings 262 and the operational data 264 can be represented in one or more databases, one or more flat files, combinations of same and/or the like.

The optimization triggers of the optimization settings 262 can each specify an event, the occurrence of which results in the optimization agent 230 optimizing the computing environment 250 in accordance with a specified optimization profile. Each optimization profile can specify, for example, one or more services to be stopped, one or more processes to be ended, one or more environment settings to be modified, combination of same and/or the like. In various implementations, different optimization profiles can be used for different user-centric workloads and/or for different categories of software applications such as, for example, productivity applications (e.g., word processing, spreadsheets, etc.), audio/video streaming applications, video games, web-browser applications, etc.

In certain embodiments, the optimization settings 262 can associate each optimization trigger with one or more of the optimization profiles. Optimization triggers can include, for example, the launch of a specific application of the software applications 260, a specific application of the software applications receiving focus, the detection of a new or different network environment/routing, voice activation by a user, manual activation by a user, scheduled activation, resource usage (e.g. processor and/or memory utilization) reaching a threshold value, combinations of same and/or the like. In that way, the optimizations specified by the associated optimization profile could be performed upon the detection of the optimization trigger.

Table 1 and Table 2 below illustrate examples of tasks and services, respectively, that can be started or stopped as part of applying optimizations. For illustrative purposes, the below-referenced examples are provided with respect to a MICROSOFT WINDOWS 10 environment. However, it should be appreciated that the principles described herein are not limited to any particular operating system or computing environment.

TABLE 1

EXAMPLE TASKS

| Task Name | Description |
| --- | --- |
| GoogleUpdateTaskUserS-1-5-21-1298670002-245384297-1525907851-1001Core | Keeps GOOGLE software up to date. |
| OneDrive Standalone Update Task v2 | ONEDRIVE Update Task |
| Office Automatic Updates | This task ensures that MICROSOFT OFFICE installation can check for updates. |
| Office ClickToRun Service Monitor | This task monitors the state of MICROSOFT OFFICE ClickToRunSvc and sends crash and error logs to MICROSOFT. |
| Office Subscription Maintenance | Task used to ensure that the MICROSOFT OFFICE Subscription licensing is current. |
| Active Directory (AD) Rights Management Service (RMS) Rights Policy Template Management (Automated) | Updates the AD RMS rights policy templates for the user. This job does not provide a credential prompt if authentication to the template distribution web service on the server fails. In this case, it fails silently. |
| AD RMS Rights Policy Template Management (Manual) | Updates the AD RMS rights policy templates for the user. This job provides a credential prompt if authentication to the template distribution web service on the server fails. |
| PolicyConverter | Converts the software restriction policies policy from XML into binary format. |
| VerifiedPublisherCertStoreCheck | Inspects the AppID certificate cache for invalid or revoked certificates. |
| MICROSOFT Compatibility Appraiser | Collects program telemetry information if opted-in to the MICROSOFT Customer Experience Improvement Program. |
| ProgramDataUpdater | Collects program telemetry information if opted-in to the MICROSOFT Customer Experience Improvement Program |
| Startup AppTask | Scans startup entries and raises notification to the user if there are too many startup entries. |
| AppHostRegistration Verifier | Verifies AppUriHandler host registrations. |
| Appuriverifierdaily | Verifies AppUriHandler host registrations. |
| Appuriverifierinstall | Verifies AppUriHandler host registrations. |
| CleanupTemporaryState | Cleans up each package's unused temporary files. |
| DsSvcCleanup | Performs maintenance for the Data Sharing Service. |
| Proxy | This task collects and uploads autochk software quality management (SQM) data if opted-in to the MICROSOFT Customer Experience Improvement Program. |
| UninstallDeviceTask | Uninstalls the PnP device associated with the specified Bluetooth service identifier (ID) |
| BgTaskRegistrationMaintenance Task | Maintains registrations for background tasks for Universal WINDOWS Platform applications. |
| UserTask | Certificate Services Client automatically manages digital identities such as Certificates, Keys and Credentials for the users and the machine, enabling enrollment, roaming and other services. |
| UserTask-Roam | Certificate Services Client automatically manages digital identities such as Certificates, Keys and Credentials for the users and the machine, enabling enrollment, roaming and other services. |
| ProactiveScan | NTFS Volume Health Scan |
| Consolidator | If the user has consented to participate in the WINDOWS Customer Experience Improvement Program, this job collects and sends usage data to MICROSOFT. |
| KernelCeipTask | The Kernel CEIP (Customer Experience Improvement Program) task collects additional information about the system and sends this data to MICROSOFT. If the user has not consented to participate in WINDOWS CEIP, this task does nothing. |

TABLE 1-continued

EXAMPLE TASKS

| Task Name | Description |
| --- | --- |
| UsbCeip | The Universal Serial Bus (USB) CEIP (Customer Experience Improvement Program) task collects USB-related statistics and information about the machine and sends it to the WINDOWS Device Connectivity engineering group at MICROSOFT. |
| Data Integrity Scan | Scans fault-tolerant volumes for latent corruptions |
| Data Integrity Scan for Crash Recovery | Scans fault-tolerant volumes for fast crash recovery |
| ScheduledDefrag | This task optimizes local storage drives. |
| Scheduled | The WINDOWS Scheduled Maintenance Task performs periodic maintenance of the computer system by fixing problems automatically or reporting them through Security and Maintenance. |
| SilentCleanup | Maintenance task used by the system to launch a silent auto disk cleanup when running low on free disk space. |
| MICROSOFT-WINDOWS-DiskDiagnosticDataCollector | The WINDOWS Disk Diagnostic reports general disk and system information to MICROSOFT for users participating in the Customer Experience Program. |
| DmClient | Update System Initiated User Feedback (SIUF) strings |
| DmClientOnScenarioDownload | Update SIUF strings |
| Property Definition Sync | Synchronizes the File Classification Infrastructure taxonomy on the computer with the resource property definitions stored in Active Directory Domain Services. |
| File History (maintenance mode) | Protects user files from accidental loss by copying them to a backup location when the system is unattended |
| Installation | Install language components that match the user's language list. |
| Notifications | Location Notification |
| WINDOWSActionDialog | Location Notification |
| WinSAT | Measures a system's performance and capabilities |
| MapsToastTask | This task shows various Map related toasts |
| MapsUpdateTask | This task checks for updates to maps which you have downloaded for offline use. Disabling this task will prevent WINDOWS from notifying you of updated maps. |
| ProcessMemoryDiagnosticEvents | Schedules a memory diagnostic in response to system events. |
| RunFullMemoryDiagnostic | Detects and mitigates problems in physical memory (RAM). |
| MNO Metadata Parser | Mobile Broadband Account Experience Metadata Parser |
| LPRemove | Launch language cleanup tool |
| GatherNetworkInfo | Network information collector |
| WiFiTask | Background task for performing per user and web interactions |
| Background Synchronization | This task controls periodic background synchronization of Offline Files when the user is working in an offline mode. |
| Logon Synchronization | This task initiates synchronization of Offline Files when a user logs onto the system. |
| Device Install Group Policy | Device Installation Group Policy Change Handler |
| Device Install Reboot Required | Notifies the user that WINDOWS needs to be restarted in order to finish setting up a device. |
| Plug and Play Cleanup | WINDOWS keeps copies of all previously installed device driver packages from WINDOWS Update and other sources, even after installing newer versions of drivers. This task will remove older versions of drivers that are no longer needed. The most current version of each driver package will be kept. This task will also remove state used by devices that have not been detected on this system for a long period of time. |
| Sysprep Generalize Drivers | Generalize driver state in order to prepare the system to be bootable on any hardware configuration. |
| AnalyzeSystem | This task analyzes the system looking for conditions that may cause high energy use. |
| CreateObjectTask | Provides support for shell components that access system data |
| FamilySafetyMonitor | Initializes Family Safety monitoring and enforcement. |
| FamilySafetyMonitorToastTask | Synchronizes the latest settings with the MICROSOFT family features service. |
| FamilySafetyRefreshTask | Synchronizes the latest settings with the MICROSOFT family features service. |
| Indexer AutomaticMaintenance | Keeps the search index up to date |
| Space AgentTask | Storage Spaces Settings |
| Storage Tiers Management Initialization | Initializes the Storage Tiers Management service when the first tiered storage space is detected on the system. Do not remove or modify this task. |
| Storage Tiers Optimization | Optimizes the placement of data in storage tiers on all tiered storage spaces in the system. |
| EnableLicenseAcquisition | Enable subscription license acquisition |
| HybridDriveCachePrepopulate | Hybrid Drive cache prepopulation task |
| HybridDriveCacheRebalance | Hybrid Drive cache rebalance maintenance task |
| ResPriStaticDbSync | Reserved Priority static db sync maintenance task |
| WsSwapAssessmentTask | Working set swap assessment maintenance task |
| SR | This task creates regular system protection points. |
| Interactive | Runs a task as the interactive user. |

TABLE 1-continued

EXAMPLE TASKS

| Task Name | Description |
| --- | --- |
| ForceSynchronize Time | This task performs time synchronization. |
| SynchronizeTime | Maintains date and time synchronization on all clients and servers in the network. If this service is stopped, date and time synchronization will be unavailable. If this service is disabled, any services that explicitly depend on it will fail to start. |
| SynchronizeTimeZone | Updates timezone information. If this task is stopped, local time may not be accurate for some time zones. |
| Refresh Settings | This task downloads settings for WINDOWS Updates. |
| Schedule Scan | This task performs a scheduled WINDOWS Update scan. |
| UpnPHostConfig | Set UPnPHost service to Auto-Start |
| WiFiTask | Background task for performing per user and web interactions |
| ResolutionHost | The WINDOWS Diagnostic Infrastructure Resolution host enables interactive resolutions for system problems detected by the Diagnostic Policy Service. It is triggered when necessary by the Diagnostic Policy Service in the appropriate user session. If the Diagnostic Policy Service is not running, the task will not run |
| WINDOWS DEFENDER Cache Maintenance | Periodic maintenance task. |
| WINDOWS DEFENDER Cleanup | Periodic cleanup task. |
| WINDOWS DEFENDER Scheduled Scan | Periodic scan task. |
| WINDOWS DEFENDER Verification | Periodic verification task. |
| QueueReporting | WINDOWS Error Reporting task to process queued reports. |
| BfeOnServiceStartTypeChange | This task adjusts the start type for firewall-triggered services when the start type of the Base Filtering Engine (BFE) is disabled. |
| UpdateLibrary | This task updates the cached list of folders and the security permissions on any new files in a user's shared media library. |
| AUScheduledInstall | Initiates scheduled install of updates on the machine. |
| AUSessionConnect | This task is used to display notifications to users. |
| Automatic App Update | Automatically updates the user's WINDOWS store applications. |
| Scheduled Start | This task is used to start the WINDOWS Update service when needed to perform scheduled operations such as scans. |
| Scheduled Start With Network | This task is used to start the WINDOWS Update service when needed to perform scheduled operations such as scans. |
| Sih | This daily task launches the SIH client (server-initiated healing) to detect and fix system components that are vital to automatic updating of WINDOWS and MICROSOFT software installed on the machine. This task can go online, evaluate applicability of healing actions, download necessary payloads to execute the actions, and execute healing actions. |
| Sihboot | This boot task launches the SIH client to finish executing healing actions to fix the system components vital to automatic updating of WINDOWS and MICROSOFT software installed on the machine. It is enabled only when the daily SIH client task fails to complete execution of applicable healing actions. This boot task never goes online and does not evaluate applicability of healing actions. |
| Automatic-Device-Join | Register this computer if the computer is already joined to an Active Directory domain. |
| NotificationTask | Background task for performing per user and web interactions |
| XblGameSaveTask | XblGameSave Standby Task |
| XblGameSaveTaskLogon | XblGameSave Logon Task |
| SqmUpload_S-1-5-21-1298670002-245384297-1525907851-1001 | This task uploads CEIP data for Portable Devices |

TABLE 2

EXAMPLE SERVICES

| Service Name (Registry) | DEFAULT STATE WINDOWS 10 Home | DEFAULT STATE WINDOWS 10 Pro | "Optimized" State |
| --- | --- | --- | --- |
| AxInstSV | Manual | Manual | Manual |
| AJRouter | Manual (Trigger Start) | Manual (Trigger Start) | Disabled |
| AppReadiness | Manual | Manual | Manual |
| Hvsics | Not Available | Not Installed (Automatic, Trigger Start) | Not Installed |

TABLE 2-continued

EXAMPLE SERVICES

| | DEFAULT STATE | DEFAULT STATE | "Optimized" |
|---|---|---|---|
| AppHostSvc | Not Installed (Automatic, Started) | Not Installed (Automatic, Started) | Not Installed |
| AppIDSvc | Manual (Trigger Start) | Manual (Trigger Start) | Manual (Trigger Start) |
| Appinfo | Manual (Trigger Start, Started) | Manual (Trigger Start, Started) | Manual (Trigger Start, Started) |
| ALG | Manual | Manual | Disabled |
| AppMgmt | Not Available | Manual | Manual |
| AppXSVC | Manual | Manual | Manual |
| aspnet_state | Not Installed (Manual) | Not Installed (Manual) | Not Installed |
| Tzautoupdate | Disabled | Disabled | Disabled |
| Background Intelligent Transfer Service (BITS) | Manual or Automatic (Delayed Start, Started) depending on other services | Manual or Automatic (Delayed Start, Started) depending on other services | Automatic (Delayed Start, Started) |
| BrokerInfrastructure | Automatic (Started) | Automatic (Started) | Automatic |
| BFE | Automatic (Started) | Automatic (Started) | Automatic |
| BDESVC | Manual (Trigger Start) | Manual (Trigger Start) | Manual (Trigger Start) |
| wbengine | Manual | Manual | Manual |
| BthHFSrv | Manual (Trigger Start) | Manual (Trigger Start) | Disabled |
| bthserv | Manual (Trigger Start) | Manual (Trigger Start) | Disabled |
| PeerDistSvc | Not Available | Manual | Disabled |
| CertPropSvc | Manual | Manual | Disabled |
| c2wts | Not Installed (Manual) | Not Installed (Manual) | Not Installed |
| NfsClnt | Not Available | Not Available | Disabled |
| ClipSVC | Manual (Trigger Start) | Manual (Trigger Start) | Manual (Trigger Start) |
| KeyIso | Manual (Trigger Start, Started) | Manual (Trigger Start, Started) | Manual (Trigger Start) |
| EventSystem | Automatic (Started) | Automatic (Started) | Automatic |
| COMSysApp | Manual | Manual | Manual |
| Browser | Manual (Trigger Start) | Manual (Trigger Start) | Manual (Trigger Start) |
| CDPSvc | Automatic (Delayed Start, Trigger Start) | Automatic (Delayed Start, Trigger Start) | Automatic (Delayed Start, Trigger Start) |
| CDPUserSvc | Automatic (Started) | Automatic (Started) | Manual |
| DiagTrack | Automatic (Started) | Automatic (Started) | Automatic |
| PimIndexMaintenanceSvc | Manual | Manual | Disabled |
| CoreUIRegistrar | Automatic (Started) | Automatic (Started) | Automatic |
| VaultSvc | Manual | Manual | Manual |
| CryptSvc | Automatic (Started) | Automatic (Started) | Automatic |
| DsSvc | Manual (Trigger Start) | Manual (Trigger Start) | Manual (Trigger Start) |
| DcpSvc | Manual (Trigger Start) | Manual (Trigger Start) | Manual (Trigger Start) |
| DcomLaunch | Automatic (Started) | Automatic (Started) | Automatic |
| DoSvc | Automatic (Delayed Start) | Automatic (Delayed Start) | Automatic (Delayed Start) |
| Device AssociationService | Manual (Trigger Start, Started) | Manual (Trigger Start, Started) | Manual (Trigger Start) |
| DeviceInstall | Manual (Trigger Start) | Manual (Trigger Start) | Manual (Trigger Start) |
| DmEnrollmentSvc | Manual | Manual | Manual |
| DsmSVC | Manual (Trigger Start) | Manual (Trigger Start) | Manual (Trigger Start) |
| DevicesFlowUserSvc _????? | Manual | Manual | Manual |
| DevQueryBroker | Manual (Trigger Start) | Manual (Trigger Start) | Manual (Trigger Start) |

TABLE 2-continued

EXAMPLE SERVICES

| | DEFAULT STATE | DEFAULT STATE | "Optimized" |
|---|---|---|---|
| Dhcp | Automatic (Started) | Automatic (Started) | Automatic |
| DPS | Automatic (Started) | Automatic (Started) | Automatic |
| WdiServiceHost | Manual (Started) | Manual (Started) | Manual |
| WdiSystemHost | Manual | Manual | Manual |
| TrkWks | Automatic (Started) | Automatic (Started) | Disabled |
| MSDTC | Manual | Manual | Manual |
| dmwappushsvc | Manual (Trigger Start) | Manual (Trigger Start) | Disabled |
| Dnscache | Automatic (Trigger Start, Started) | Automatic (Trigger Start, Started) | Automatic (Trigger Start) |
| MapsBroker | Automatic (Delayed Start) | Automatic (Delayed Start) | Disabled |
| DsRoleSvc | Not Available | Not Installed (Manual) | Not installed |
| DusmSvc | Automatic (Started) | Automatic (Started) | Disabled |
| embeddedmode | Manual (Trigger Start) | Manual (Trigger Start) | Manual (Trigger Start) |
| EFS | Manual (Trigger Start) | Manual (Trigger Start) | Manual (Trigger Start) |
| EntAppSvc | Manual | Manual | Manual |
| EapHost | Manual | Manual | Manual |
| Fax | Manual | Manual | Uninstalled |
| fhsvc | Manual (Trigger Start) | Manual (Trigger Start) | Manual (Trigger Start) |
| fdPHost | Manual (Started) | Manual (Started) | Manual |
| FDResPub | Manual (Started) | Manual (Started) | Manual |
| lfsvc | Manual (Trigger Start, Started) | Manual (Trigger Start, Started) | Disabled |
| gpsvc | Automatic (Trigger Start) | Automatic (Trigger Start) | Automatic (Trigger Start) |
| hkmsvc | Not Available | Manual | Disabled |
| HomeGroupListener | Manual | Manual | Manual |
| HomeGroupProvider | Manual (Trigger Start, Started) | Manual (Trigger Start, Started) | Manual (Trigger Start) |
| hns | Not Available | Not Installed (Manual) | Not Installed |
| hidserv | Manual (Trigger Start) | Manual (Trigger Start) | Manual (Trigger Start) |
| HvHost | Manual (Trigger Start) | Manual (Trigger Start) | Disabled |
| vmickvpexchange | Manual (Trigger Start) | Manual (Trigger Start) | Disabled |
| vmicguestinterface | Manual (Trigger Start) | Manual (Trigger Start) | Disabled |
| vmicshutdown | Manual (Trigger Start) | Manual (Trigger Start) | Disabled |
| vmicheartbeat | Manual (Trigger Start) | Manual (Trigger Start) | Disabled |
| vmcompute | Not Available | Not Installed (Manual, Trigger Start, Started) | Not Installed |
| vmicvmsession | Manual (Trigger Start) | Manual (Trigger Start) | Disabled |
| vmicrdv | Manual (Trigger Start) | Manual (Trigger Start) | Disabled |
| vmictimesync | Manual (Trigger Start) | Manual (Trigger Start) | Disabled |
| vmms | Not Available | Not Installed (Automatic, Started) | Not Installed |
| vmicvss | Manual (Trigger Start) | Manual (Trigger Start) | Disabled |
| IISADMIN | Not Installed (Automatic, Started) | Not Installed (Automatic, Started) | Not Installed |
| IKEEXT | Manual (Trigger Start) | Manual (Trigger Start) | Manual (Trigger Start) |
| irmon | Manual | Manual | Disabled |
| UI0Detect | Manual | Manual | Manual |
| Shared Access | Manual (Trigger Start) | Manual (Trigger Start) | Disabled |
| iphlpsvc | Automatic (Started) | Automatic (Started) | Disabled |
| IpxlatCfgSvc | Manual (Trigger Start) | Manual (Trigger Start) | Disabled |
| PolicyAgent | Manual (Trigger Start) | Manual (Trigger Start) | Manual (Trigger Start) |
| KtmRm | Manual (Trigger Start) | Manual (Trigger Start) | Manual (Trigger Start) |
| lltdsvc | Manual | Manual | Manual |
| LSM | Automatic (Started) | Automatic (Started) | Automatic |
| wlpasvc | Manual (Trigger Start) | Manual (Trigger Start) | Disabled |
| LPDSVC | Not Installed (Automatic, Started) | Not Installed (Automatic, Started) | Not Installed |

TABLE 2-continued

EXAMPLE SERVICES

| | DEFAULT STATE | DEFAULT STATE | "Optimized" |
|---|---|---|---|
| LxssManager | Not Installed (Manual) | Not Installed (Manual) | Not Installed |
| MSMQ | Not Installed (Automatic, Started) | Not Installed (Automatic, Started) | Not Installed |
| MSMQTriggers | Not Installed (Automatic, Started) | Not Installed (Automatic, Started) | Not Installed |
| MessagingService | Manual (Trigger Start) | Manual (Trigger Start) | Manual (Trigger Start) |
| diagnosticshub.standardcollector.service | Manual | Manual | Disabled |
| wlidsvc | Manual (Trigger Start) | Manual (Trigger Start) | Manual (Trigger Start) |
| AppVClient | Not Available | Disabled | Disabled |
| ftpsvc | Not Installed (Automatic, Started) | Not Installed (Automatic, Started) | Not Installed |
| MSiSCSI | Manual | Manual | Disabled |
| MsKeyboardFilter | Not Installed (Disabled) | Not Installed (Disabled) | Not Installed |
| NgcSvc | Manual (Trigger Start) | Manual (Trigger Start) | Manual (Trigger Start) |
| NgcCtnrSvc | Manual (Trigger Start) | Manual (Trigger Start) | Manual (Trigger Start) |
| swprv | Manual (Started at boot, then stops) | Manual (Started at boot, then stops) | Manual |
| smphost | Manual | Manual | Manual |
| SmsRouter | Manual (Trigger Start) | Manual (Trigger Start) | Disabled |
| WmsRepair | Not Available | Not Installed (Automatic, Started) | Not Installed |
| Wms | Not Available | Not Installed (Automatic, Started) | Not Installed |
| NaturalAuthentication | Manual | Manual | Disabled |
| NetMsmqActivator | Not Installed (Automatic, Started) | Not Installed (Automatic, Started) | Not Installed |
| NetPipeActivator | Not Installed (Automatic, Started) | Not Installed (Automatic, Started) | Not Installed |
| NetTcpActivator | Not Installed (Automatic, Started) | Not Installed (Automatic, Started) | Not Installed |
| NetTcpPortSharing | Disabled (Changed to Manual and Started if the previous 3 Services are installed) | Disabled (Changed to Manual and Started if the previous 3 Services are installed) | Uninstalled |
| Netlogon | Manual | Manual | Disabled |
| NcdAutoSetup | Manual (Trigger Start, Started) | Manual (Trigger Start, Started) | Disabled |
| NcbService | Manual (Trigger Start, Started) | Manual (Trigger Start, Started) | Disabled |
| Netman | Manual | Manual | Manual |
| NcaSVC | Manual (Trigger Start) | Manual (Trigger Start) | Manual |
| netprofm | Manual (Started) | Manual (Started) | Manual |
| NlaSvc | Automatic (Started) | Automatic (Started) | Automatic |
| NetSetupSvc | Manual (Trigger Start) | Manual (Trigger Start) | Manual (Trigger Start) |
| nsi | Automatic (Started) | Automatic (Started) | Automatic |
| CscService | Not Available | Manual (Trigger Start) | Disabled |
| defragsvc | Manual | Manual | Manual |
| SEMgrSvc | Manual (Trigger Start) | Manual (Trigger Start) | Disabled |
| PNRPsvc | Manual | Manual | Manual |
| p2psvc | Manual | Manual | Manual |
| p2pimsvc | Manual | Manual | Manual |
| PerfHost | Manual | Manual | Manual |
| pla | Manual | Manual | Manual |
| PhoneSvc | Manual (Trigger Start) | Manual (Trigger Start) | Disabled |
| PlugPlay | Manual (Started) | Manual (Started) | Manual |
| PNRPAutoReg | Manual | Manual | Manual |
| WPDBusEnum | Manual (Trigger Start) | Manual (Trigger Start) | Manual (Trigger Start) |
| Power | Automatic (Started) | Automatic (Started) | Automatic |
| Spooler | Automatic (Started) | Automatic (Started) | Automatic |
| PrintNotify | Manual | Manual | Manual |
| wercplsupport | Manual | Manual | Manual |
| PcaSvc | Automatic (Started) | Automatic (Started) | Automatic (Started) |

TABLE 2-continued

EXAMPLE SERVICES

| | DEFAULT STATE | DEFAULT STATE | "Optimized" |
|---|---|---|---|
| QWAVE | Manual | Manual | Manual |
| RmSvc | Manual | Manual | Disabled |
| RasAuto | Manual | Manual | Manual |
| RasMan | Manual | Manual | Manual |
| SessionEnv | Manual (Maybe Started when using Remote Desktop) | Manual (Maybe Started when using Remote Desktop) | Disabled |
| TermService | Manual (Maybe Started when using Remote Desktop) | Manual (Maybe Started when using Remote Desktop) | Disabled |
| UmRdpService | Manual (Maybe Started when using Remote Desktop) | Manual (Maybe Started when using Remote Desktop) | Disabled |
| RpcSs | Automatic (Started) | Automatic (Started) | Automatic |
| RpcLocator | Manual | Manual | Disabled |
| RemoteRegistry | Disabled | Disabled | Disabled |
| RetailDemo | Manual | Manual | Disabled |
| iprip | Not Installed (Automatic, Started) | Not Installed (Automatic, Started) | Not Installed |
| Remote Access | Disabled | Disabled | Disabled |
| RpcEptMapper | Automatic (Started) | Automatic (Started) | Automatic |
| seclogon | Manual | Manual | Manual |
| SstpSvc | Manual | Manual | Manual |
| SamSs | Automatic (Started) | Automatic (Started) | Automatic |
| WSCSVC | Automatic (Delayed Start, Started) | Automatic (Delayed Start, Started) | Automatic (Delayed Start) |
| SensorDataService | Manual (Trigger Start) | Manual (Trigger Start) | Disabled |
| SensrSvc | Manual (Trigger Start) | Manual (Trigger Start) | Disabled |
| SensorService | Manual (Trigger Start) | Manual (Trigger Start) | Disabled |
| LanmanServer | Automatic (Started) | Automatic (Started) | Automatic |
| shpamsvc | Disabled | Disabled | Disabled |
| ShellHWDetection | Automatic (Started) | Automatic (Started) | Automatic |
| simptcp | Not Installed (Automatic, Started) | Not Installed (Automatic, Started) | Not Installed |
| SCardSvr | Disabled | Disabled | Disabled |
| ScDeviceEnum | Manual (Trigger Start) | Manual (Trigger Start) | Disabled |
| SCPolicySvc | Manual | Manual | Disabled |
| SNMP | Not Installed (Automatic, Started) | Not Installed (Automatic, Started) | Not Installed |
| SNMPTRAP | Manual | Manual | Disabled |
| sppsvc | Automatic (Delayed Start, Trigger Start) | Automatic (Delayed Start, Trigger Start) | Automatic (Delayed Start, Trigger Start) |
| SVSVC | Manual (Trigger Start) | Manual (Trigger Start) | Manual (Trigger Start) |
| SSDPSRV | Manual (Started) | Manual (Started) | Manual |
| StateRepository | Manual (Started) | Manual (Started) | Manual |
| WiaRpc | Manual | Manual | Manual |
| StorSvc | Manual (Trigger Start) | Manual (Trigger Start) | Disabled |
| TieringEngineService | Manual | Manual | Manual |
| SysMain | Automatic (Started) | Automatic (Started) | Automatic |
| OneSyncSvc | Automatic (Delayed Start) | Automatic (Delayed Start) | Automatic (Delayed Start) |
| SENS | Automatic (Started) | Automatic (Started) | Automatic |
| SystemEventsBroker | Automatic (Trigger Start, Started) | Automatic (Trigger Start, Started) | Automatic (Trigger Start) |
| Schedule | Automatic (Started) | Automatic (Started) | Automatic |
| lmhosts | Manual (Trigger Start, Started) | Manual (Trigger Start, Started) | Manual (Trigger Start, Started) |
| TapiSrv | Manual | Manual | Manual |
| Themes | Automatic (Started) | Automatic (Started) | Automatic |
| tiledatamodelsvc | Automatic (Started) | Automatic (Started) | Automatic |
| TimeBroker | Manual (Trigger Start, Started) | Manual (Trigger Start, Started) | Manual (Trigger Start) |
| TokenBroker | Manual (Started) | Manual (Started) | Manual (Started) |

TABLE 2-continued

EXAMPLE SERVICES

| | DEFAULT STATE | DEFAULT STATE | "Optimized" |
|---|---|---|---|
| TabletInputService | Manual (Trigger Start) | Manual (Trigger Start) | Disabled |
| UwfServcingSvc | Not Available | Not Installed (Disabled) | Not Installed |
| UsoSvc | Manual (Started) | Manual (Started) | Manual (Started) |
| upnphost | Manual | Manual | Manual |
| UserDataSvc | Manual | Manual | Manual |
| UnistoreSvc | Manual | Manual | Manual |
| UevAgentService | Not Available | Disabled | Disabled |
| UserManager | Automatic (Trigger Start, Started) | Automatic (Trigger Start, Started) | Automatic (Trigger Start) |
| ProfSvc | Automatic (Started) | Automatic (Started) | Automatic |
| vds | Manual | Manual | Manual |
| VSS | Manual | Manual | Manual |
| W3LOGSVC | Not Installed (Manual) | Not Installed (Manual) | Not Installed |
| WalletService | Manual | Manual | Manual |
| WMSVC | Not Installed (Manual) | Not Installed (Manual) | Not Installed |
| WebClient | Manual (Trigger Start) | Manual (Trigger Start) | Disabled |
| WFDSConSvc | Manual (Trigger Start) | Manual (Trigger Start) | Disabled |
| AudioSrv | Automatic (Started) | Automatic (Started) | Automatic |
| AudioEndpointBuilder | Automatic (Started) | Automatic (Started) | Automatic |
| SDRSVC | Manual | Manual | Manual |
| WbioSrvc | Manual (Trigger Start) | Manual (Trigger Start) | Disabled |
| FrameServer | Manual | Manual | Disabled |
| wcncsvc | Manual | Manual | Disabled |
| Wcmsvc | Automatic (Trigger Start, Started) | Automatic (Trigger Start, Started) | Automatic (Trigger Start) |
| Sense | Not Available | Manual | Manual |
| WdNisSvc | Manual (Started) | Manual (Started) | Manual (Started) |
| WinDefend | Automatic (Started) | Automatic (Started) | Automatic |
| wudfsvc | Manual (Trigger Start, Started) | Manual (Trigger Start, Started) | Manual (Trigger Start, Started) |
| WEPHOSTSVC | Manual (Trigger Start) | Manual (Trigger Start) | Manual (Trigger Start) |
| WerSvc | Manual (Trigger Start) | Manual (Trigger Start) | Manual (Trigger Start) |
| Wecsvc | Manual | Manual | Manual |
| EventLog | Automatic (Started) | Automatic (Started) | Automatic |
| MpsSvc | Automatic (Started) | Automatic (Started) | Automatic |
| FontCache | Automatic (Started) | Automatic (Started) | Automatic |
| StiSvc | Manual | Manual | Manual |
| wisvc | Manual | Manual | Disabled |
| msiserver | Manual | Manual | Manual |
| LicenseManager | Manual (Trigger Start) | Manual (Trigger Start) | Manual (Trigger Start) |
| Winmgmt | Automatic (Started) | Automatic (Started) | Automatic |
| WMPNetworkSvc | Manual | Manual | Disabled (Uninstalled) |
| icssvc | Manual (Trigger Start) | Manual (Trigger Start) | Disabled |
| TrustedInstaller | Manual | Manual | Manual |
| Wms | Not Available | Automatic (Started) | Disabled |
| WmsRepair | Not Available | Automatic (Started) | Disabled |
| FontCache3.0.0.0 | Not Installed (Manual) | Not Installed (Manual) | Not Installed |
| WAS | Not Installed (Manual, Started) | Not Installed (Manual, Started) | Not Installed |
| WpnService | Automatic (Started) | Automatic (Started) | Automatic (Started) |
| WpnUserService | Manual | Manual | Manual |
| WinRM | Manual | Manual | Disabled |
| WSearch | Automatic (Delayed Start, Started) | Automatic (Delayed Start, Started) | Automatic (Delayed Start) |
| SecurityHealthService | Automatic (Started) | Automatic (Started) | Automatic (Started) |
| spectrum | Manual (Trigger Start) | Manual (Trigger Start) | Disabled |
| W32Time | Manual (Trigger Start) | Manual (Trigger Start) | Manual (Trigger Start) |

TABLE 2-continued

EXAMPLE SERVICES

|  | DEFAULT STATE | DEFAULT STATE | "Optimized" |
|---|---|---|---|
| wuauserv | Manual (Trigger Start) | Manual (Trigger Start) | Manual (Trigger Start) |
| WinHttpAutoProxySvc | Manual (Started) | Manual (Started) | Manual |
| dot3svc | Manual | Manual | Manual |
| WlanSvc | Manual (Automatic with Wireless Card Installed) | Manual (Automatic with Wireless Card Installed) | Manual (Automatic with Wireless Card Installed) |
| wmiApSrv | Manual | Manual | Manual |
| workfolderssvc | Manual | Manual | Uninstalled |
| Lanman Workstation | Automatic (Started) | Automatic (Started) | Automatic |
| W3SVC | Not Installed (Automatic, Started) | Not Installed (Automatic, Started) | Not Installed |
| WwanSvc | Manual | Manual | Disabled |
| XblAuthManager | Manual | Manual | Disabled |
| XblGameSave | Manual (Trigger Start) | Manual (Trigger Start) | Disabled |
| XboxNetApiSvc | Manual | Manual | Disabled |

Table 3 below illustrates an example of an optimization scenario for video or movie watching. According to the example of Table 3, the launch of a video or movie-watching application could serve as an optimization trigger. Further, the optimization trigger can be associated with an optimization profile that specifies a defined set of optimization steps which are particular to video or movie watching.

In similar fashion, Table 4 below illustrates an example of an optimization scenario for photo editing. According to the example of Table 4, the launch of a photo-editing application could serve as an optimization trigger. As described previously, the optimization trigger can be associated with an optimization profile that specifies a defined set of optimization steps which are particular to photo editing.

TABLE 3

EXAMPLE OPTIMIZATION SCENARIO: VIDEO OR MOVIE WATCHING

| | |
|---|---|
| Description | Defines a particular set of operating system services to pause/stop, scheduled tasks to defer, applications to close, network parameters optimized for streaming, and silencing of any notification systems that could interrupt the video or movie watching experience. |
| Optimization Trigger | Launch of one or more specified movie applications or movie-viewing web services (e.g. WINDOWS MEDIA PLAYER and NETFLIX, respectively) |
| Optimizations Applied Upon Optimization Trigger (From Optimization Profile) | 1. Stop background file indexing services to increase available central processing unit (CPU) processing and reduce disk I/O load (e.g., WSearch from Table 2 above)<br>2. Stop update related operating system services from downloading patches thereby ensuring all network bandwidth resources are available to stream video content (e.g., WINDOWS Update (wuauserv) and Background Intelligent Transfer Service (BITS) from Table 2 above)<br>3. Stop any application/service that could impact the streaming flow of movie related data packets. This could include closing of any other network-dependent software that may be memory-resident at the time.<br>4. Prevent/Pause all operating system scheduled tasks from launching (e.g., See Table 1 above).<br>E.g., GOOGLE and ONEDRIVE update tasks from Table 1 above.<br>E.g., any task scheduled to run in the next 8 hours based on Date column<br>5. Close all previously launched memory resident applications.<br>E.g., MICROSOFT WORD, MICROSOFT EXCEL, ADOBE PHOTOSHOP.<br>6. Prevent system and software notifications from being displayed.<br>E.g., Stop WINDOWS notification services such as Printer Extensions and Notifications, System Event Notification, WINDOWS Push Notifications System Service.<br>E.g., Close SKYPE, email, and other communication applications that can create desktop notifications.<br>7. Scan current network conditions and optimize network software based on detected conditions. |
| Reversals Applied When Optimization Ends | 1. Restart background file indexing services and update services.<br>2. Re-enable operating system's patch-related services.<br>3. Re-Launch previously closed network-dependent applications.<br>4. Un-Pause scheduled tasks previously paused.<br>5. Re-Launch previously closed memory resident applications.<br>6. Re-Enable notification systems.<br>7. Re-scan network and adjust network parameters for general use based on currently detected conditions. |

TABLE 4

EXAMPLE OPTIMIZATION SCENARIO: PHOTO EDITING

| | |
|---|---|
| Description | Defines a particular set of operating system services to pause/stop, scheduled tasks to defer, and a small subset of applications to close, but leaves notification systems on for email, chat, and collaboration. |
| Optimization Trigger | Launch of a photo-editing application such as ADOBE PHOTOSHOP. |
| Optimizations Applied Upon Optimization Trigger | 1. Stop non-essential processor-intensive operating system services to free up CPU and memory resources available for photo editing (e.g., apply the 'Optimized' settings to the list of WINDOWS services).<br>2. Close applications not relevant to photo editing (e.g. games such Sudoku, Solitaire, etc.) to free up additional resources.<br>3. Optimize available photo editing software operational parameters to reflect detected system capabilities. |
| Reversals Applied When Optimization Ends | 1. Restart previously stopped operating system services.<br>2. Restart previously closed applications.<br>3. Restore photo-editing software parameters to previous values. |

Figure 3:
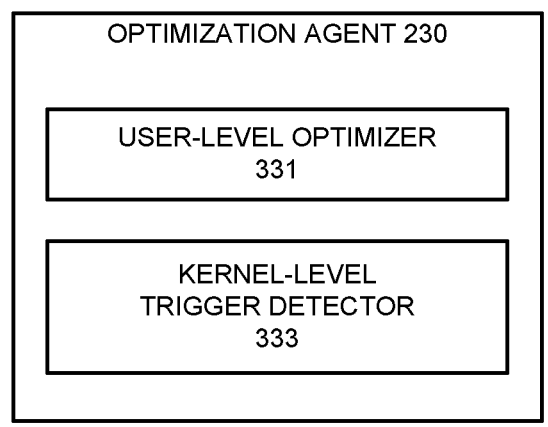
FIG. 3 illustrates an optimization agent in more detail.

FIG. 3 illustrates the optimization agent 230 in more detail. The optimization agent 230 includes a user-level optimizer 331 and a kernel-level trigger detector 333. In certain embodiments, CPUs provide a plurality of operating modes that place various restrictions on the type and scope of operations that can be performed. In certain embodiments, consumer user applications execute in a mode in which access to hardware or memory is restricted, often referred to as "user mode." For example, in various cases, applications executing in user mode may have no direct access to hardware or memory so that, instead, such applications must utilize system application programming interfaces to access hardware or memory. In contrast, the operating system and low-level, trusted operating-system functions may execute in an unrestricted mode, often referred to as "kernel mode."

Although consumer user applications typically execute in user mode, these applications are typically instantiated by the operating system in kernel mode. For instance, when loading an application, the operating system, in kernel mode, typically first copies an executable image into RAM, creates a main application thread, and performs other initialization steps. Advantageously, in certain embodiments, the kernel-level trigger detector 333 can execute in the kernel mode so as to detect kernel-level events such as, for example, the copy of an executable image into RAM, the creation of a main application thread, and/or other initialization steps. In that way, the kernel-level trigger detector 333 can detect the initiation of an application, identify an appropriate optimization profile, and apply optimizations before the application has a chance to run. In general, the user-level optimizer 331 and the kernel-level trigger detector 333 can be considered two distinct software agents that collectively constitute the optimization agent 230.

Figure 4:
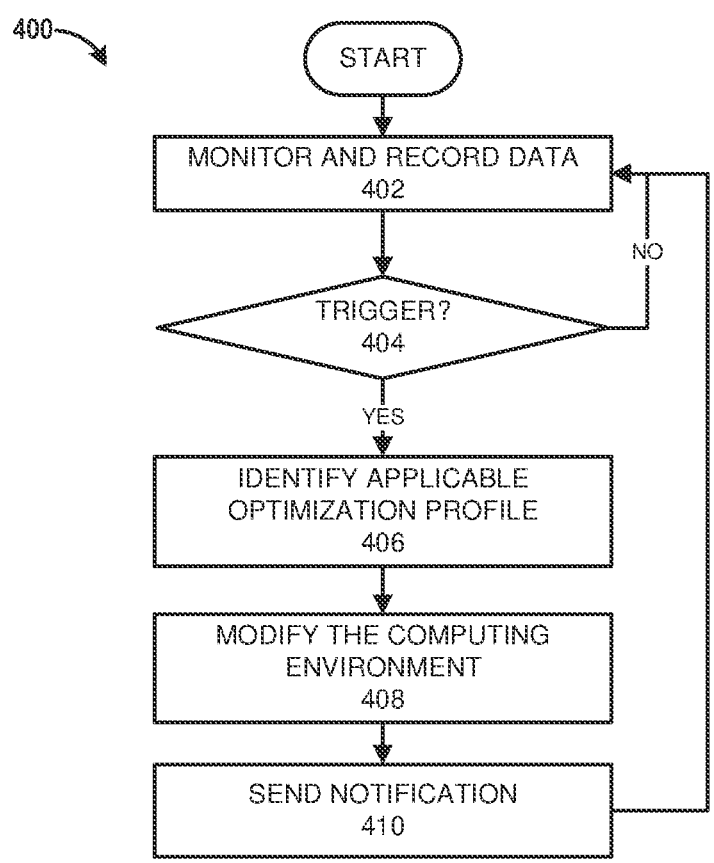
FIG. 4 illustrates an example of a process for performing agent-initiated optimization on a managed system.

FIG. 4 illustrates an example of a process 400 for performing agent-initiated optimization on a managed system such as, for example, one of the managed systems 122 of FIG. 1 and/or the computer system 222 of FIG. 2. In certain embodiments, the process 400 can be initiated on-demand by an administrator, super user or other user for a monitored system (e.g., via the user systems 160 in communication with the central management system 140 and the managed systems 122, both of FIG. 1). The process 400 can be implemented by any system that can provide a computing environment. For example, the process 400, in whole or in part, can be implemented by the central management system 140, one or more of the managed systems 122, one or more of the optimization agents 130, the computer system 222, the optimization agent 230, the user-level optimizer 331, the kernel-level trigger detector 333, a component of the foregoing, and/or the like. In some cases, the process 400 can be performed generally by the system 100 of FIG. 1. Although any number of systems, in whole or in part, can implement the process 400, to simplify discussion, the process 400 will be described in relation to the computer system 222 of FIG. 2.

At block 402, the optimization agent 230 monitors the computing environment 250 for user behaviors and/or for optimization triggers that are specified in the optimization settings 262. The block 402 can include, for example, generating and/or recording user-behavior data and optimization metadata, for example, as part of the operational data 264. For example, in various embodiments, for each detected user behavior, the recorded user-behavior data can indicate an application (e.g., by application identifier), a type of user behavior (e.g., launch, close, giving focus or taking away focus), a timestamp and/or other information.

With regard to monitoring for optimization triggers, with reference to Tables 3 and 4 above, the block 402 could include, for example, monitoring for the launch of a movie-watching application or web service and the launch of a photo-editing application. More particularly, the block 402 can include monitoring for kernel-level events of the type described above that are indicative of such launches. As described previously, the optimization triggers of the optimization settings 262 may relate to, or be associated with, the user-centric workload specifications of the optimization settings 262.

At decision block 404, the kernel-level trigger detector 333 determines whether an optimization trigger has been detected. If not, the process 400 returns to block 402 and the kernel-level trigger detector 333 continues to monitor the computing environment 250 as described previously. Otherwise, if it is determined at decision block 404 that an optimization trigger has been detected, the process 400 proceeds to block 406. Advantageously, in certain embodiments, as discussed above, the optimization trigger can be a kernel-level event that allows optimization to occur, for example, before an application responsible for the trigger (e.g., a movie-watching or photo-editing application) begins running.

At block 406, the user-level optimizer 331 identifies, from the optimization settings 262, an optimization profile that is applicable to the detected optimization trigger. For example, with reference to the examples of Tables 3 and 4 above, if the detected optimization trigger is the launch of a movie-watching or photo-editing application, the user-level optimizer 331 can identify the corresponding movie-watching or photo-editing optimization profile that is associated in memory with the detected optimization trigger. In various embodiments, the detected optimization trigger may correspond to, or be associated in memory with, a user-centric workload specification. In such a case, both the detected optimization trigger and the optimization profile may be associated in memory with the corresponding user-centric workload specification.

At block 408, the user-level optimizer 331 modifies the computing environment in accordance with the identified optimization profile. For example, the block 408 can include stopping one or more services, ending one or more processes, changing one or more settings, combinations of same and/or the like. In an example, with respect to movie-watching and photo-editing scenarios, the block 408 could include performing the optimization steps shown in Tables 3 and 4, respectively. In some embodiments, the block 408 can include storing or caching information related to how to reverse whatever modifications are made at block 408 (e.g., a prior state of changed settings).

At block 410, the user-level optimizer 331 can send a notification regarding the modifications to a user of the computer system 222. The notification can be, for example, a notification on a user interface provided by the user-level optimizer 331, a popup notification, an email, an instant message, combinations of same and/or the like. From block 410, the process 400 returns to block 402, where the optimization agent 230 again monitors the computing environment as described previously. In certain embodiments, the process 400 can continue to execute until terminated by a user or administrator, a computer process or an entity in communication with the computer system 222, or whenever other suitable termination criteria is satisfied. For example, in some embodiments, a reboot of the computer system 222 can result in the process 400 terminating and any optimizations being reversed.

Although the process 400 is described and illustrated as being executed in a particular sequence, the blocks of the process 400 need not be executed in that sequence. Furthermore, although the process 400 is illustrated as using an optimization agent that distributes certain functionality between a kernel-level trigger detector and a user-level optimizer, it should be appreciated that the same functionality could be also be allocated to a single agent or to three or more agents. For example, in some embodiments, a single agent executing at the user level or the kernel level could incorporate all of the functionality described above with respect to the user-level optimizer 331 and the kernel-level trigger detector 333.

Figure 5:
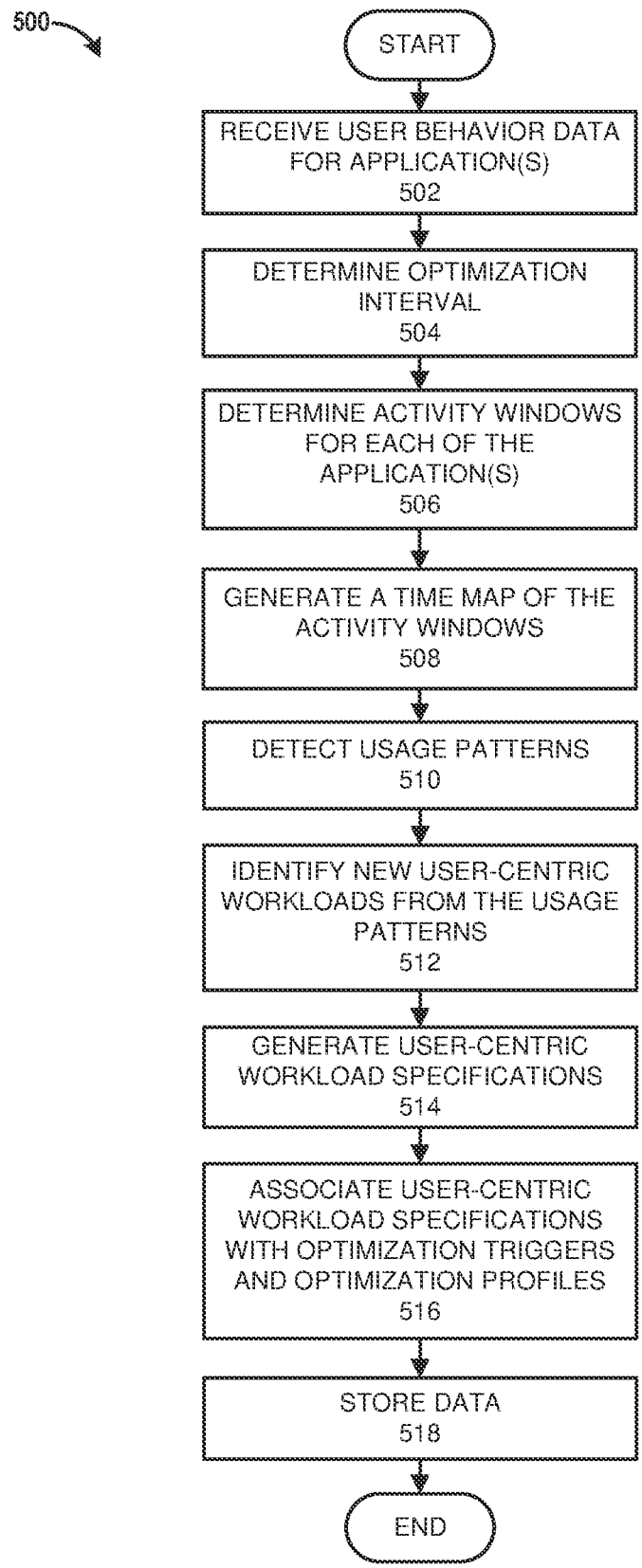
FIG. 5 illustrates an example of a process for specifying and optimizing user-centric workloads using recorded user-behavior data.

FIG. 5 illustrates an example of a process 500 for specifying and optimizing user-centric workloads using recorded user-behavior data. In certain embodiments, the process 500 can be initiated on-demand by an administrator, super user or other user (e.g., via the user systems 160 in communication with the central management system 140 and the managed systems 122, both of FIG. 1). The process 500 can use user-behavior data for, or from, a monitored system or a group of monitored systems. The process 500 can be implemented by any system that can provide a computing environment. For example, the process 500, in whole or in part, can be implemented by the central management system 140, one or more of the managed systems 122, one or more of the optimization agents 130, the computer system 222, the optimization agent 230, the user-level optimizer 331, the kernel-level trigger detector 333, a component of the foregoing, and/or the like. In some cases, the process 500 can be performed generally by the system 100 of FIG. 1. Although any number of systems, in whole or in part, can implement the process 500, to simplify discussion, the process 500 will be described as being executed by the optimization manager 142 of FIG. 1.

At block 502, the optimization manager 142 receives user-behavior data for one or more software applications over a historical period of time. In certain embodiments, the user-behavior data that is received can include, for example, user-behavior data for a particular managed system of the managed systems 122, user-behavior-data for all managed systems within a particular tenant system of the tenant systems 110, user-behavior data for all of the managed systems 122, combinations of the same and/or the like. The user-behavior data can indicate, for each user behavior, an application (e.g., by application identifier), a type of user behavior (e.g., application launch, application close, application gaining focus or application losing focus), a timestamp and/or other information. In various embodiments, the historical period of time may span, for example, a historical three weeks, six months, one year, etc.

At block 504, the optimization manager 142 determines an optimization interval. The optimization interval is typically a recurring period of time that will serve as a reference point for analysis and optimization. For example, the optimization interval may correspond to a generalized time interval such as workdays, workday mornings, workday afternoons, weekdays, weekend days, holidays, particular days of the week (e.g., Mondays, Tuesdays, etc.) combinations of the foregoing and/or the like. In some cases, the optimization interval can be pre-specified.

At block 506, the optimization manager 142 determines, for the optimization interval, activity windows for each of the software applications represented in the user-behavior data. The activity windows can correspond to specific historical windows of user interaction with each application, as evidenced by the user-behavior data, that fall within an instance of the optimization interval. For example, if the optimization interval is weekdays, the activity windows can correspond to specific historical windows of user interaction with each application that occurred on Monday, Tuesday, Wednesday, Thursday or Friday. In various embodiments, the user interaction within a given window may be continuous, sporadic, etc. For example, an activity window of a given application may begin with a user launching the application and end with the user closing the application. Continuing this example, in some implementations, the user-activity window may end upon other criteria such as, for example, if the application is not given focus for a configurable period of time, such that a new activity window may begin if the application is again given focus (e.g., in correspondence to a time when the application is again given focus).

Figure 6:
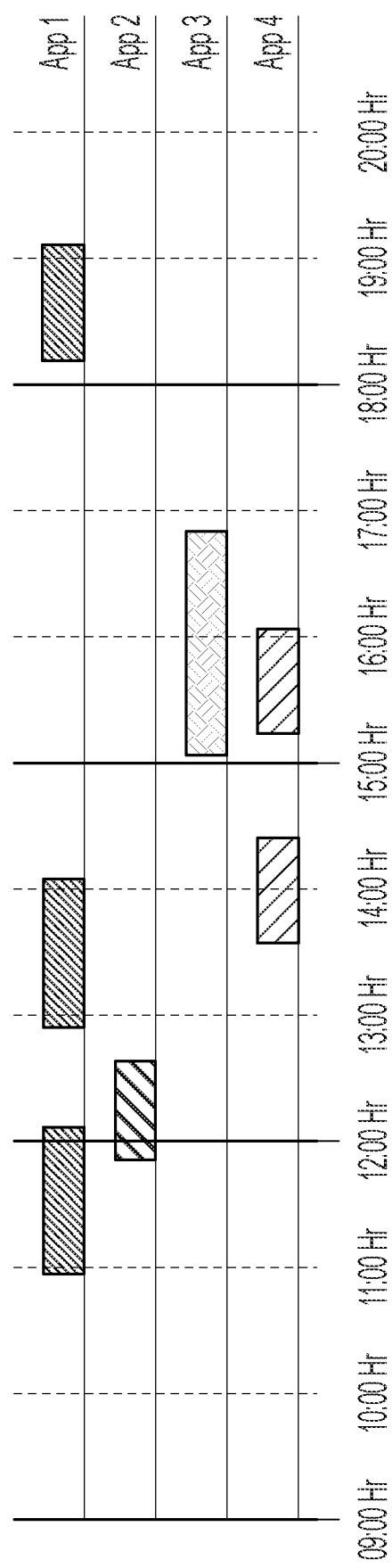
FIG. 6 illustrates an example of a time map.
Figure 7:
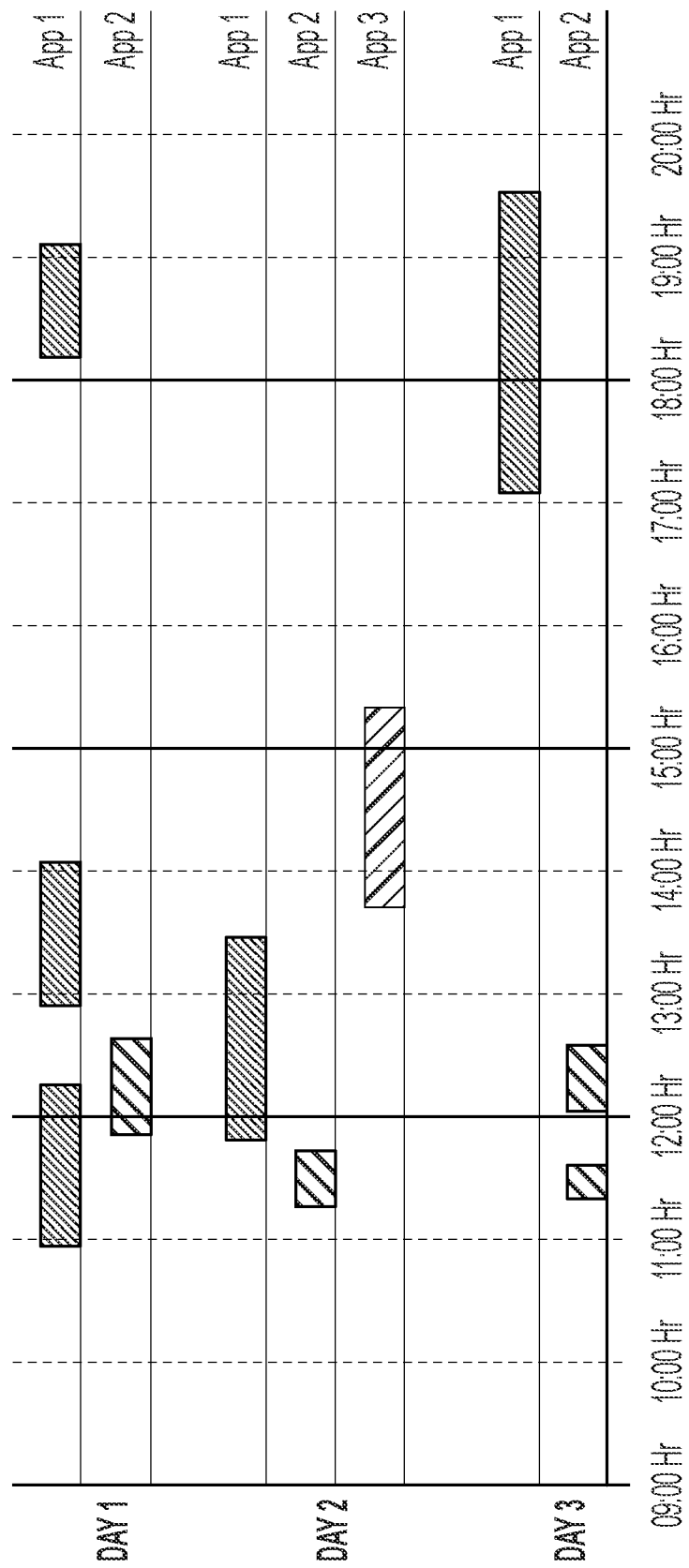
FIG. 7 illustrates an example of a time map.

At block 508, the optimization manager 142 generates a time map of the activity windows of the applications over the historical period of time. In general, the time map correlates the activity windows of each application to historical instances of the optimization interval. For example, if the optimization interval is weekdays, the time map can represent every weekday within the historical period of time, and can correlate, according to software application, each activity window to points or periods within the weekday to which the activity window corresponds. For example, in some embodiments, for simplicity of analysis, the time map can be divided into a plurality of historical time blocks (e.g., hours of a weekday), and a given application can be indicated as active during an entirety of a given time block if it has an activity window spanning the corresponding time block. According to this example, the given application can otherwise be indicated as inactive. In other embodiments, the time map can include a continuous representation of the activity windows without regard to specific divisions or time blocks. FIGS. 6 and 7 illustrate examples of time maps.

At block 510, the optimization manager 142 detects usage patterns that occur in the historical period of time. In some embodiments, the optimization manager 142 can detect, relative to the plurality of software applications that are represented in the user-behavior data received at the block 502, patterns of applications that are executed individually (e.g., without others of the software applications) and/or patterns of applications that are executed in combination. The usage patterns can vary, for example, by user, user type (e.g., according to user classification), tenant, time window, combinations of the foregoing and/or the like. In various embodiments, the detection of usage patterns can utilize statistical learning, machine learning, and/or other methods. Examples will be described following the description of FIG. 5.

At block 512, the optimization manager 142 identifies new user-centric workloads from the detected usage patterns. In some embodiments, the block 512 can be subsumed within the block 510, such that the usage patterns detected at the block 510 are coextensive with the new user-centric workloads that are identified at the block 512. In addition, or alternatively, the block 512 can involve automatically analyzing data resulting the block 510, where thresholding, for example, is applied to determine those patterns that merit identification as new user-centric workloads (e.g., those that meet frequency or statistical criteria).

At block 514, the optimization manager 142 generates user-centric workload specifications for the new user-centric workloads, if any, that are identified at the block 512. Each user-centric workload specification can specify, for example, each application that is indicated in the corresponding detected usage pattern.

At block 516, the optimization manager 142 associates each new user-centric workload specifications with an optimization trigger (or a plurality of optimization triggers) and an optimization profile. In some embodiments, the optimization trigger and the optimization profile can be created as part of the block 516. In addition, or alternatively, the optimization trigger and the optimization profile can be user-specified. In some cases, the optimization trigger of some user-centric workload specifications can be, for example, a user-initiated launch of one or more applications specified therein. In addition, or alternatively, the optimization trigger can be scheduled (e.g., weekdays, 10 am-noon), such that an associated optimization profile is implemented for that time.

At block 518, data resulting from the process 500 is stored in memory (e.g., in the local data store(s) 120 of FIG. 1 or the optimization settings 262 of FIG. 2). In various embodiments, the new user-centric workloads specified in the new user-centric workload specifications may be optimized according to the associated optimization triggers and the associated optimization profiles using, for example, the process 400 of FIG. 4. After block 518, the process 500 ends.

Examples of detecting usage patterns and identifying user-centric workloads based thereon will now be described. As mentioned previously, a user-centric workload be specified in terms of one or more software applications over a given time window. As each application consumes machine resources, user-centric workloads can be used to determine peak or average resource demands. Consequently, it is possible to boost machine performance by applying different optimization profiles to various resources (e.g., processor and memory) based on expected or historical workloads.

Example of User-Centric Workloads for a Single Managed System

For example, for a single managed system, the problem of determining a user-centric workload for a single managed system can be described as the combination of 1) a data capture and 2) data processing:

Data Capture: A goal of this step is to discover what software applications are used and at what times. User-behavior data can be captured, for example, as a vector (e.g., App ID, Launch Timestamp, Close Timestamp, Additional Features), where App ID is a unique identifier for the user initiated app, Launch Timestamp and Close Timestamp are two timestamps specifying when the application was launched and closed so that [Launch Timestamp, Close Timestamp] constitutes a time interval of continuous application usage (See FIG. 6). The data can also possess an optional sub-vector represented by Additional Features, which constitutes a series of machine resources readings such as CPU or memory usage associated to each software application, where such series can be included in optimization metadata. Alternatively, the data can also be captured by periodic probing into the list of apps loaded in memory and their associated resource footprints.

Data Processing: A goal of this step is to determine usage patterns. FIG. 6 exemplifies a data capture for one day showing four software applications, some of which overlap (e.g., "App 3" and "App 4"). This could signal that the two applications are being used concurrently (e.g. music is playing while using the word processor) or that the user switches between them (e.g. images are searched and copied from an Internet browser and pasted into the word processor). In certain embodiments, overlaps indicate that multiple applications are using or demanding the same resources.

In order to process the above-described data, time can be discretized at a convenient granularity and the applications in use can be counted. For instance, in FIG. 6, assuming a granularity of one-hour blocks, it can be seen that "App 1" is used exclusively at times (e.g., before 11:00 and after 16:00) and concurrently with other applications at other times, i.e., "App 2" (11:00-13:00) and "App 4" (13:00-15:00). Similarly, "App 3" and "App 4" are used concurrently in the window 15:00-17:00.

In general, for a managed system with n applications a user can launch or use up to $2^n$ possible combinations of applications at any given time block; therefore, for an m-dimensional time discretization, the total number of time-app combinations yields $2^n*m$. In practice, many actual combinations could be rare and therefore irrelevant for workload identification. Moreover, the theoretical size of the problem calls for efficient dimensionality reduction techniques.

One way to achieve dimensionality reduction is by means of statistical learning. FIG. 7 shows an example time map for three different days. For each time block it is possible to calculate the marginal probability of using an application according to Equation 1 below.

$$P(\text{App } x | \text{Time block } t) = \text{Number of days App } x \text{ has been used in time block } t/\text{Total number of days} \quad \text{Equation 1}$$

For example, in FIG. 7, the probability of using "App 1" in the time block between 18:00 and 19:00 becomes P(App 1| 18:00-19:00)=2/3. The probability of using multiple applications concurrently can be given by $P(\bigcap_i \text{App } i | t)$, where i represents the set of applications under consideration. For example, in FIG. 7 the set of all possible combinations of applications is i={(App1 ∧App2), (App1 ∧App3), (App2 ∧App3), (App1 ∧App2 ∧App3)}.

Following the example in FIG. 7, for the time block between 12:00 and 13:00, the probability of using "App 1" is P(App 1|12:00-13:00)=2/3, the probability of using "App 2" is P(App 2|12:00-13:00)=2/3 and the probability of using both applications at the same time is given by P(App 1 ∩App 2|12:00-13:00)=1/3. In this case, the events clearly are not independent.

The procedure described so far is based on a discretized time and the distributions are therefore discrete. It is also possible to generate continuous distributions using kernel-density estimation.

Once the probability distributions have been determined, thus providing quantification for individual usage patterns, the problem of identifying the user-centric workloads can be stated as finding the application or application combinations whose probability of occurrence is larger than a threshold γ, i.e. find all values of j such that P(j|t)>γ, where j denotes elements of the power set of all applications under consideration. This procedure effectively reduces the size of the problem by discarding unlikely applications and application combinations.

The resulting profile or workload of the process described above can include of a list of applications expected to be used at determined time blocks, which applications can be the identified user-specific workloads of an embodiment of the block 512 of the process 500 of FIG. 5. In various embodiments, this can be used to anticipate user actions, for example, by automatically launching applications or applying appropriate optimizations to the applications that are expected to run.

Example of User-Centric Workloads for a Population of Managed Systems

Individual workloads are very useful, but they can be subject to different drawbacks. For example, workloads during work or school days are likely to differ greatly from those during vacation and holidays. If a computer is shared by multiple users, these may show very different usage patterns from each other as well. These situations require the ability and flexibility to determine multiple usage patterns for the same equipment over time. Likewise, if some applications are deleted or new applications installed, the usage pattern is likely to change. All these situations may require capturing data for a very long period of time before a workload can be identify reliably.

On the other hand, for multiple reasons it may be helpful to identify common usage patterns or workloads across the user base (e.g., the managed systems 122 of FIG. 1). For instance, if "App 1" and "App 2" are commonly used at the same time, the individual optimizations applied to each of them in isolation may not be as performant or could even interfere with each other when the applications are used concurrently. Consumer behavior analytics and marketing strategies can also benefit from a better understanding of the usage patterns.

The problem of common workloads identification can be approached as an unsupervised machine-learning problem. In this problem, the input data becomes the individual workloads determined according to the description provided in the previous section. Without loss of generality, the time component may be changed depending on the question. For example, instead of using hour long blocks, the probability can be calculated at the day level, i.e. the likelihood of using an application on any given day.

Once the time granularity is resolved and the data from the individual machines collected, the total number of individual applications plus application combinations will determine the dimensionality of the input, which quantity will be called k. The individual workloads can then be expressed as a k-dimensional vector such as the one shown below in Equation 2.

$$x(u)=(x_1, x_2, \ldots, x_k) \quad \text{Equation 2}$$

In Equation 2, x(u) is the data for user u and its components $x_j$ represent the usage of application combination j. If x(u) is coded as a binary vector, $x_j=0$ indicates the application combination j never occurred (or occurred with very low frequency) whereas $x_j=1$ indicates the application combination occurred at the desired threshold γ (see previous section).

Alternatively, x(u) can be a real-valued vector in $[0,1]^k$ whose component represents the probability of observing a given application or application combination.

In order to identify common workloads, different unsupervised learning clustering algorithms, such as k-means, DBSCAN or the expectation-minimization algorithms can be used. The representation of x(u) will determine what distance metrics can be used. In the former case, since the vector is binary, a binary distance metric such as Hamming distance or Jaccard distance may be used. In the latter case, Euclidean distance may suffice, but other real-valued distance measures may also be used.

In a typical embodiment, the outcome of the clustering algorithm is a set of clusters characterized by a large degree of similarity among the members of each cluster. In some cases, such as with k-means, the cluster is characterized by a specific vector. However not all methods need to produce characteristic vectors. If they are needed, representative points can be determined among the members of a cluster or interval valued vectors can be determined as well.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of identifying and optimizing user workloads, the method comprising, by a computer system: receiving user-behavior data for a plurality of software applications over a period of time; determining activity windows for the plurality of software applications; generating a time map of the activity windows over the period of time; detecting a usage pattern that occurs in the period of time, wherein the usage pattern indicates two or more applications of the plurality of software applications that are used in combination; identifying a user-centric workload from the usage pattern; generating a user-centric workload specification for the user-centric workload, wherein the user-centric workload identifies the two or more applications indicated by the usage pattern; associating the user-centric workload specification with an optimization trigger and an optimization profile; and optimizing the user-centric workload in accordance with the optimization trigger and the optimization profile;

wherein: the activity windows are determined for an optimization interval, the optimization interval comprising a recurring period of time that serves as a reference point for optimization; and the activity windows correspond to specific historical windows of user interaction with each application of the plurality of software applications, as evidenced by the user-behavior data, that fall within an instance of the optimization interval.

2. The method of claim 1, wherein the user-behavior data comprises user-behavior data for a particular managed computer system.

3. The method of claim 1, wherein the user-behavior data comprises user-behavior data for a plurality of managed systems.

4. The method of claim 1, wherein the user-behavior data is selected from the group consisting of application launch, application close, application gaining focus, and application losing focus.

5. The method of claim 1, wherein at least one of the activity windows comprises a period of continuous user interaction.

6. The method of claim 1, wherein at least one of the activity windows begins with a user launching a particular application of the plurality of software applications and ends with the user closing the particular application.

7. The method of claim 1, wherein: a first activity window of the activity windows begins with a user launching a particular application of the plurality of software applications and ends with the particular application not being given focus for a configurable period of time; and a second activity window of the activity windows, subsequent to the first activity window, begins in correspondence to a time when the particular application is again given focus.

8. The method of claim 1, wherein the time map correlates the activity windows for the plurality of software applications to historical instances of the optimization interval.

9. The method of claim 1, wherein: the time map is divided into a plurality of historical time blocks; the time map indicates each application of the plurality of software applications as active during each time block of the plurality of historical time blocks for which the application has an activity window spanning the time block; and the time map indicates each application of the plurality of software applications as inactive during each time block of the plurality of historical time blocks for which the application does not have an activity window spanning the time block.

10. The method of claim 1, wherein the optimization interval is selected from the group consisting of: workdays, workday mornings, workday afternoons, weekdays, weekend days, holidays, and particular days of the week.

11. The method of claim 1, wherein the identifying comprises determining that the usage pattern merits identification as the user-centric workload based on at least one of frequency criteria and statistical criteria.

12. The method of claim 1, wherein the optimization trigger comprises a user-initiated launch of at least one of the two or more applications indicated by the usage pattern.

13. The method of claim 1, wherein the optimization trigger comprises a scheduled time.

14. The method of claim 1, wherein the optimizing comprises: monitoring a computing environment for the optimization trigger; responsive to detection of the optimization trigger, identifying the optimization profile as applicable to the optimization trigger; and modifying the computing environment in accordance with the optimization profile.

15. The method of claim 14, wherein the optimization profile specifies at least one of the following: one or more tasks or services to be stopped; one or more tasks or services to started; one or more processes to be ended; and one or more environment settings to be modified.

16. The method of claim 1, comprising: detecting a plurality of usage patterns that occur in the period of time; identifying a plurality of user-centric workloads from the plurality of usage patterns; generating a plurality of user-centric workload specifications for the plurality of user-centric workloads; associating each user-centric workload of the plurality of user-centric workload specifications with an optimization trigger and an optimization profile; storing data resulting from the associating in optimization settings; and optimizing the plurality of user-centric workloads in accordance with the optimization settings.

17. The method of claim 16, wherein the detecting the plurality of usage patterns comprises: detecting, relative to the plurality of software applications, patterns of applications that are executed individually; and detecting, relative to the plurality of software applications, patterns of applications that are executed in combination.

18. A computer system comprising a processor and memory, wherein the processor and the memory in combination are operable to implement a method comprising: receiving user-behavior data for a plurality of software applications over a period of time; determining activity windows for the plurality of software applications; generating a time map of the activity windows over the period of time; detecting a usage pattern that occurs in the period of time, wherein the usage pattern indicates two or more applications of the plurality of software applications that are used in combination; identifying a user-centric workload from the usage pattern; generating a user-centric workload specification for the user-centric workload, wherein the user-centric workload identifies the two or more applications indicated by the usage pattern; associating the user-centric workload specification with an optimization trigger and an optimization profile; and optimizing the user-centric workload in accordance with the optimization trigger and the optimization profile;

wherein: the activity windows are determined for an optimization interval, the optimization interval comprising a recurring period of time that serves as a reference point for optimization; and the activity windows correspond to specific historical windows of user interaction with each application of the plurality of software applications, as evidenced by the user-behavior data, that fall within an instance of the optimization interval.

19. A computer-program product comprising a non-transitory computer-usable medium having computer-readable program code embodied therein, the computer-readable program code adapted to be executed to implement a method comprising: receiving user-behavior data for a plurality of software applications over a period of time; determining activity windows for the plurality of software applications; generating a time map of the activity windows over the period of time; detecting a usage pattern that occurs in the period of time, wherein the usage pattern indicates two or more applications of the plurality of software applications that are used in combination; identifying a user-centric workload from the usage pattern; generating a user-centric workload specification for the user-centric workload, wherein the user-centric workload identifies the two or more applications indicated by the usage pattern; associating the user-centric workload specification with an optimization trigger and an optimization profile; and optimizing the user-centric workload in accordance with the optimization trigger and the optimization profile;

wherein: the activity windows are determined for an optimization interval, the optimization interval comprising a recurring period of time that serves as a reference point for optimization; and the activity windows correspond to specific historical windows of user interaction with each application of the plurality of software applications, as evidenced by the user-behavior data, that fall within an instance of the optimization interval.

* * * * *